(12) United States Patent
Hsu

(10) Patent No.: US 6,357,133 B1
(45) Date of Patent: Mar. 19, 2002

(54) FLEXIBLE RULE REWINDING DEVICE

(76) Inventor: Cheng-Hui Hsu, No. 126, Pad Chung Road, Hsin Tien City, Taipei Hsien (TW)

( * ) Notice: Subject to any disclaimer, the term of this patent is extended or adjusted under 35 U.S.C. 154(b) by 57 days.

(21) Appl. No.: 09/586,267

(22) Filed: May 31, 2000

(51) Int. Cl.$^7$ .......................... G01B 3/10; B65H 75/30
(52) U.S. Cl. .................. 33/755; 33/759; 33/756; 33/769; 33/761; 242/395; 242/395.1
(58) Field of Search .................. 33/755, 756, 759, 33/761, 762, 765, 769; 242/381.5, 395, 395.1

(56) References Cited

U.S. PATENT DOCUMENTS

| | | | | |
|---|---|---|---|---|
| 4,164,334 A | * | 8/1979 | Rathbun et al. | 33/761 |
| 4,189,107 A | * | 2/1980 | Quenot et al. | 33/761 |
| 5,014,437 A | * | 5/1991 | Sun | 33/761 |
| 5,042,159 A | * | 8/1991 | Millen | 33/756 |
| 5,718,056 A | * | 2/1998 | Miyasaka et al. | 33/769 |
| 5,768,797 A | * | 6/1998 | Trevino | 33/761 |
| 5,791,581 A | * | 8/1998 | Loeffler et al. | 33/769 |
| 6,134,801 A | * | 10/2000 | Miyasaka | 242/381.5 |

FOREIGN PATENT DOCUMENTS

| | | | |
|---|---|---|---|
| JP | 57-501 | * | 1/1982 |
| JP | 5-164502 | * | 6/1993 |

* cited by examiner

*Primary Examiner*—Diego Gutierrez
*Assistant Examiner*—Yaritza Guadalupe
(74) *Attorney, Agent, or Firm*—Pro-Techtor International Services

(57) ABSTRACT

A flexible rule rewinding device comprised of a front cover plate, a rear cover plate, a winding shaft, a center gear, two gears, a flexible rule reel mount, and a cover plate capable of rewinding long distance flexible rules rapidly and with little effort to thereby increase flexible rule practicality.

1 Claim, 4 Drawing Sheets

FLEXIBLE RULE REWINDING DEVICE

BACKGROUND OF THE INVENTION

1) Field of the Invention

The invention herein relates to flexible rule rewinding device capable of rewinding long distance flexible rules rapidly and with minimum effort to thereby increase the practical value of flexible rules.

2) Description of the Prior Art

In conventional long distance flexible rules, the measuring blades are directly rewound onto a shaft and there is considerable frictional resistance and, furthermore, after a flexible ruler is pulled out a long distance to a take a measurement, rewinding it requires much time and effort; to enable more convenience during flexible rule utilization, the inventor of the invention herein, based on many years of professional manufacturing experience, conducted research and development followed by extensive testing and improvement to enable the present invention to achieve superior practicality which culminated in the successful completion of the flexible rule rewinding device of the invention herein.

SUMMARY OF THE INVENTION

The primary objective of the invention herein is to provide a flexible rule rewinding device capable of rapid and effortless flexible rule rewinding by reducing the frictional resistance of retraction and thereby improve the practical value of such devices.

To enable a further understanding by the examination committee of the structural particulars and other original content of the invention herein, the detailed description of the embodiments is accompanied by the brief description of the drawings below to further elaborate upon the advantages and innovative features of the present invention.

DETAILED DESCRIPTION OF THE INVENTION

Figure 1:
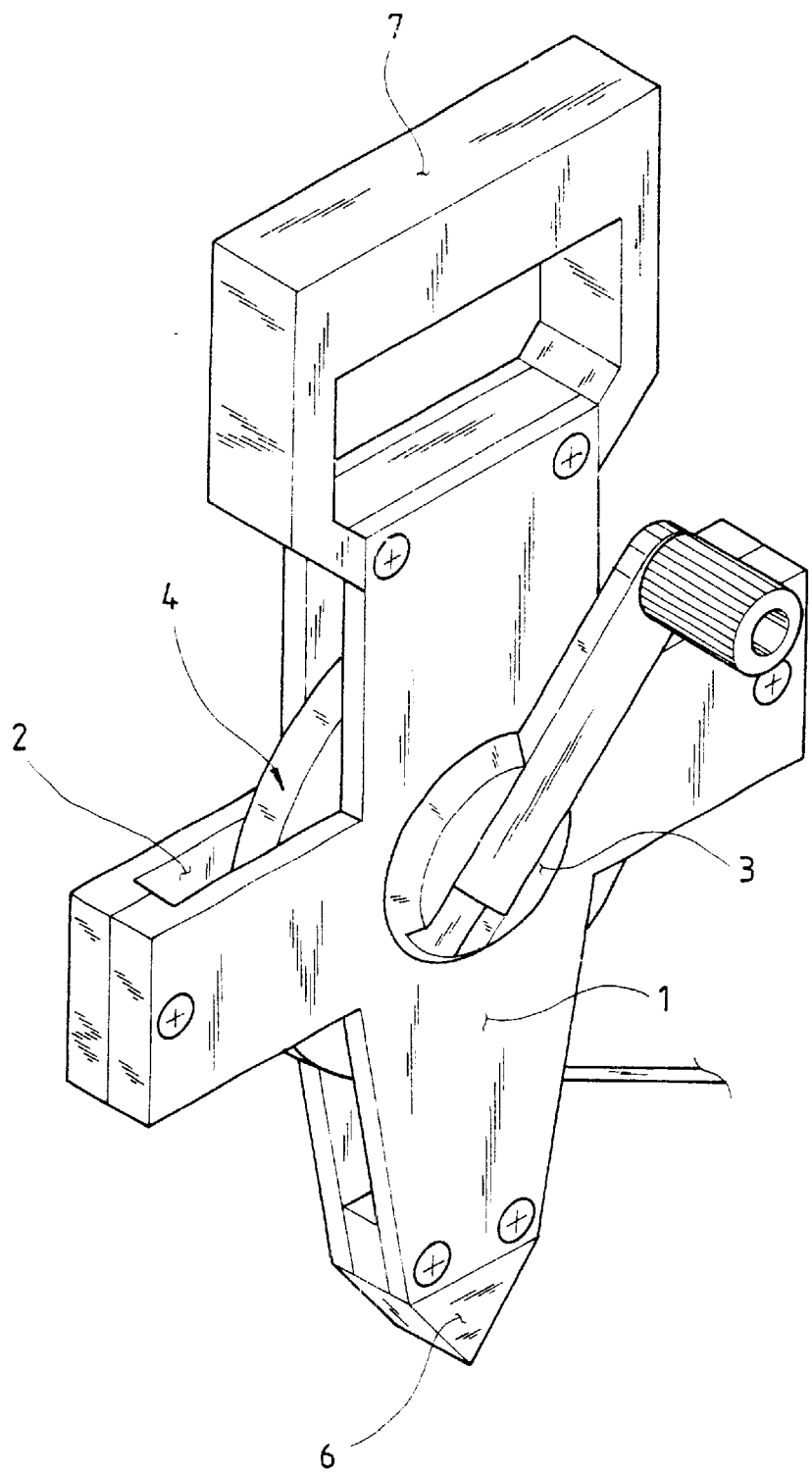
FIG. 1 is an isometric drawing of the invention herein.
Figure 2:
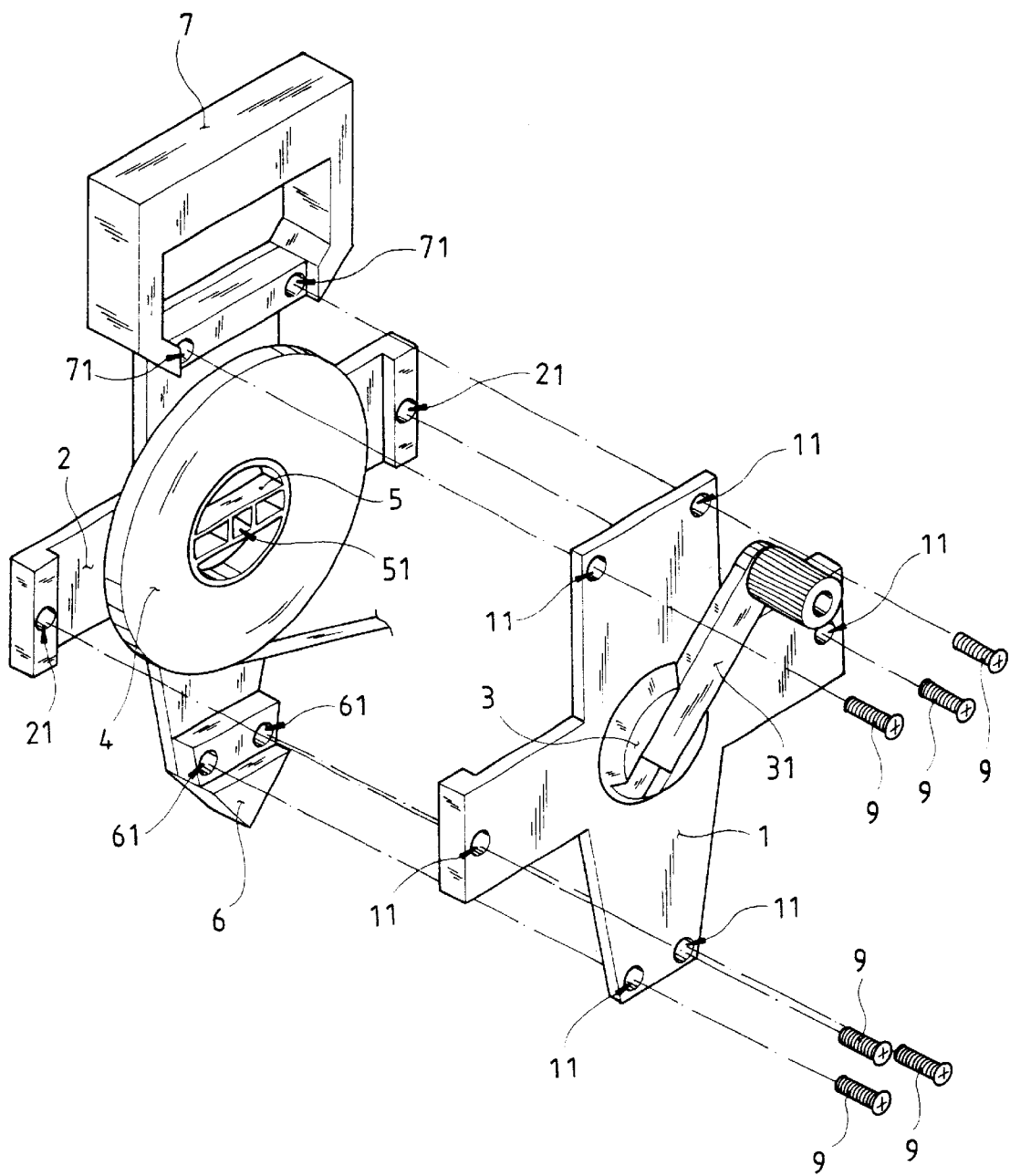
FIG. 2 is an exploded drawing of the invention herein.
Figure 3:
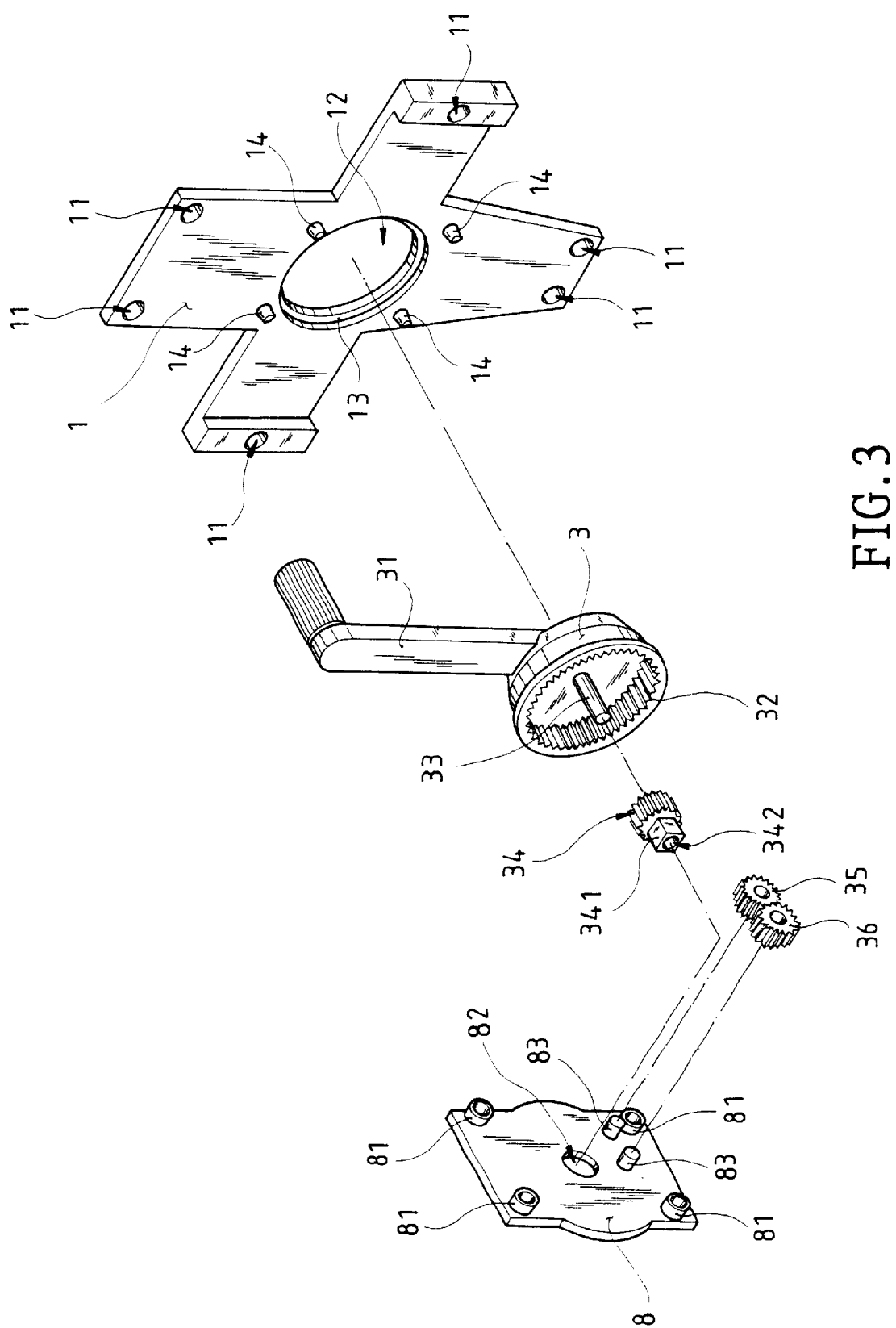
FIG. 3 is an exploded drawing of the winding gear assembly of the invention herein.

Referring to FIG. 1, FIG. 2, and FIG. 3, the flexible rule rewinding device of the invention herein is comprised of a front cover plate 1, a rear cover plate 2, a winding shaft 3, a center gear 34, two gears 35 and 36, a flexible rule reel mount 5, and a cover plate 8, of which:

The front cover plate 1 is unitarily constructed of a plastic material injection molded into a cross-shaped planar component, a plurality of screw holes 11 are respectively formed in the upper, lower, left and right extent of the front cover plate 1, a center circular opening 12 is formed at the middle of the said front cover plate 1, an annular support lip 13 is formed along the inner sides of the said center circular opening 12 and, furthermore, four tapered posts 14 are formed on the interior side of the said front cover plate 1 around the said center circular opening 12.

The said winding shaft 3 has positioned on its exterior side a rotatable crank handle 31, a ring gear 32 is formed along the inside of the said winding shaft 3 and, furthermore, a rod 33 projects from the center of the interior side of the said winding shaft 3; a square extension 341 projects from the front end of the said center gear 34 and, furthermore, a round hole 342 is formed through the medial point of the said center gear 34 and the said round hole 342 is fitted onto the said rod 33 projecting from the center of the interior side of the said winding shaft 3 to enable free rotation; the said cover plate 8 is a flat thin element having a hollow sleeve 81 protruding from each of the four corners of its interior side, the positions of which correspond to the tapered posts 14 formed on the interior side of the front cover plate 1; there is a round opening 82 in the middle of the said cover plate 8 and, furthermore, two posts 83 project from the lower aspect of the round opening 82 and one of the two gears 35 and 36 is installed on each of the two posts 83. The said winding shaft 3 is first placed through the center circular opening 12 of the front cover plate 1 and secured onto the support lip 13 and then the tapered posts 14 on the interior side of the front cover plate 1 are respectively inserted into the four hollow sleeves 81 of the cover plate 8.

A measuring blade 4 is wound over the flexible rule reel mount 5, with the said flexible rule reel mount 5 having a recessed square hole 51 formed in the center of its interior side and the said flexible rule reel mount 5 also has a round shaft (not shown in the drawings) projecting from its exterior side that is inserted and fixed in a shaft hole at the center of the rear cover plate 2; a locating cone 6 is inserted onto the lower end of the rear cover plate 2, a hand hold 7 is inserted onto the top end of the rear cover plate 2, and the front cover plate 1 is assembled to the rear cover plate 2, following which a number of screws 9 are inserted into the plurality of screw holes 11 in the front cover plate 1 and, furthermore, into the screw holes 61 of the locating cone 6 as well as the screw holes 71 of the hand hold 7 and then tightened in the plurality of screw holes 21 in the rear cover plate 2. The square extension 341 of the center gear 34 is placed through the round opening 82 in the middle of the cover plate 8 and then insertion mounted in the recessed square hole 51 formed in the center of the flexible rule reel mount 5.

Figure 4:
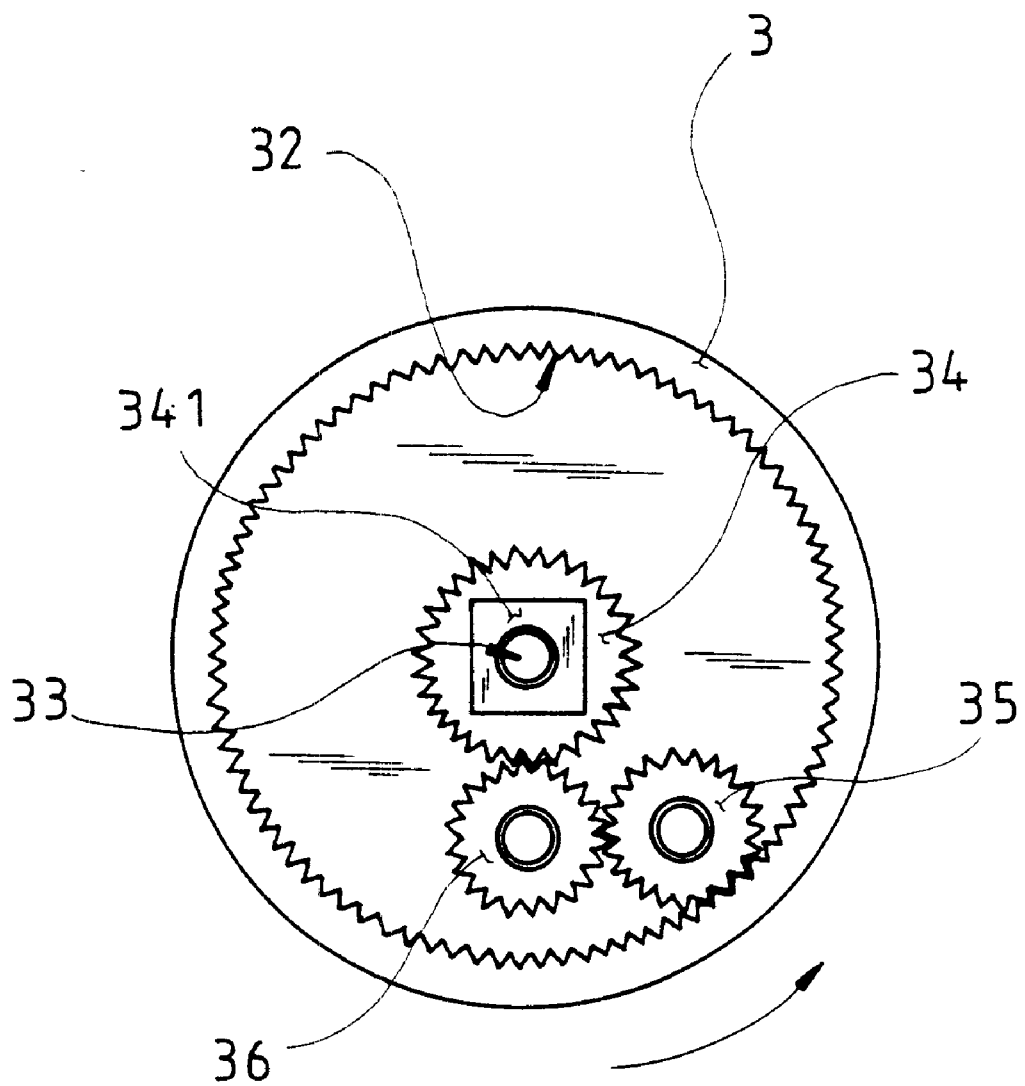
FIG. 4 is an orthographic drawing of the winding gear assembly of the invention herein.

In the winding gear assembly of the invention herein, as indicated in FIG. 4, when the winding shaft 3 is rotated, the ring gear 32 inside of the said winding shaft 3 drives the gear 35 into synchronous rotation, the said gear 35 then impels the gear 36 to rotate in the opposite direction, and finally the gear 36 rotates the center gear 34 in the same direction as the ring gear 32 and, since the square extension 341 of the center gear 34 is insertion mounted in the recessed square hole 51 formed in the flexible rule reel mount 5, the flexible rule reel mount 5 is capable of being synchronously, rapidly, and effortlessly rotated to thereby rewind the flexible rule fast and with less energy.

While said structure of the invention herein is definitely capable of achieving the claimed functions and performance, the description of the most preferred embodiment of present invention only discloses the innovative features thereof and shall not be construed as a limitation of the invention herein and, furthermore, all modifications and equivalent adaptations shall remain within the scope and claims of the invention herein.

In summation of the foregoing section, since the invention herein is an original and innovative among products in the same category and, furthermore, capable of even greater performance as well as practical value and, furthermore, no identical or similar article has even been disclosed in the market, the present invention is hereby submitted to the examination committee for review and the granting of the commensurate patent rights.

What is claimed is:

1. A flexible rule rewinding device comprised of a front cover plate, a rear cover plate, a winding shaft, a center gear, two gears, a flexible rule reel mount, and a cover plate, of which:

said front cover plate is unitatily constructed of a plastic material injection molded into a cross-shaped planar component, a plurality of screw holes are respectively formed in the upper, lower, left, and right extent of the said front cover plate, a center circular opening is formed at the middle of the said front cover plate, an annular support lip is formed along the inner sides of the center circular opening and, furthermore, four tapered posts are formed on the interior side of the front cover plate around the center circular opening;

the winding shaft has positioned on its exterior side a rotatable crank handle, a ring gear is formed along the inside of the said winding shaft and, furthermore, a rod projects from the center of the interior side of the said winding shaft; a square extension projects from the front end of the said center gear and, furthermore, a round hole is formed through the medial point of the said center gear and the said round hole is fitted onto the said rod projecting from the center of the interior side of the said winding shaft to enable free rotation; the said cover plate is a flat thin element having a hollow sleeve protruding from each of the four corners of its interior side, the positions of which correspond to the said tapered posts formed on the interior side of the said front cover plate, there is a round opening in the middle of the said cover plate and, furthermore, two posts project from the lower aspect of the said round opening and one of the said two gears is installed on each of the said two posts;

the said winding shaft is first placed through the said center circular opening of the said front cover plate and secured onto the said support lip and then the said tapered posts on the interior side of the said front cover plate are respectively inserted into the four said hollow sleeves of the said cover plate;

a measuring blade is wound over the said flexible rule reel mount, with the said flexible rule reel mount having a recessed square hole formed in the center of its interior side and the said flexible rule reel mount is inserted and fixed to the center of the said rear cover plate; a locating cone is inserted onto the lower end of the said rear cover plate, a hand hold is inserted onto the top end of the said rear cover plate, and the said front cover plate is assembled to the said rear cover plate, following which a number of screws are inserted in the plurality of said screw holes in the said front cover plate and, furthermore, into the screw holes of the said locating cone as well as the screw holes of the said hand hold and then tightened in a plurality of screw holes in the said rear cover plate; the said square extension of the said center gear is placed through the said round opening in the middle of the said cover plate and then insertion mounted in the said recessed square hole formed in the center of the said flexible rule reel mount to complete the assembly of entire flexible rule structure.

* * * * *